(12) United States Patent
Geurts

(10) Patent No.: US 8,864,974 B2
(45) Date of Patent: Oct. 21, 2014

(54) HYDROGEN GENERATOR

(75) Inventor: David Geurts, Auckland (NZ)

(73) Assignee: Printer Ribbon Inkers P.R.I. Limited, Auckland (NZ)

( * ) Notice: Subject to any disclaimer, the term of this patent is extended or adjusted under 35 U.S.C. 154(b) by 682 days.

(21) Appl. No.: 12/746,950

(22) PCT Filed: Dec. 4, 2008

(86) PCT No.: PCT/NZ2008/000327
§ 371 (c)(1),
(2), (4) Date: Sep. 9, 2010

(87) PCT Pub. No.: WO2009/075590
PCT Pub. Date: Jun. 18, 2009

(65) Prior Publication Data
US 2011/0006544 A1    Jan. 13, 2011

(30) Foreign Application Priority Data
Dec. 10, 2007  (NZ) ........................................ 564225

(51) Int. Cl.
*C25B 9/06* (2006.01)
*C25B 1/06* (2006.01)
*B63J 99/00* (2009.01)
*H01M 8/06* (2006.01)

(52) U.S. Cl.
CPC . *C25B 9/063* (2013.01); *C25B 1/06* (2013.01); *B63J 99/00* (2013.01); *H01M 8/0656* (2013.01); *Y02E 60/366* (2013.01); *Y02E 60/50* (2013.01); *Y02T 70/5209* (2013.01); *Y02T 90/46* (2013.01)

USPC .......................................................... 205/637

(58) Field of Classification Search
None
See application file for complete search history.

(56) References Cited

U.S. PATENT DOCUMENTS 3,766,045 A * 10/1973 Itakura et al. ............... 204/278.5
4,339,324 A *  7/1982 Haas ............................ 204/270

(Continued)

FOREIGN PATENT DOCUMENTS

CN    101126162    2/2008
EP      0 663 459    * 7/1995 ................ C25B 9/00

(Continued)

OTHER PUBLICATIONS

JP 2006097061 A—Tamakoshi English abstract, machine translation, and partial human translation.*

(Continued)

*Primary Examiner* — James Lin
*Assistant Examiner* — Ho-Sung Chung
(74) *Attorney, Agent, or Firm* — Dann, Dorfman, Herrell and Skillman, P.C.

(57) ABSTRACT

A hydrogen generator comprising an enclosure, a series of spaced plates contained within the enclosure and defining between them liquidtight cells, with a plate forming a first wall of each cell of a nobler material than a plate forming a second wall of that cell, and where a first place of the series is an anode arranged to be connected to a power supply and the last plate of the series is a cathode arranged to be connected to a power supply, an inlet to each cell arranged to allow an electrolyte to flow into the cell, and an outlet from each cell arranged to allow an electrolyte and hydrogen gas to flow out of the cell.

14 Claims, 4 Drawing Sheets

(56) References Cited

U.S. PATENT DOCUMENTS

| | | | |
|---|---|---|---|
| 5,989,407 A * | 11/1999 | Andrews et al. | 205/626 |
| 6,610,193 B2 * | 8/2003 | Schmitman | 205/628 |
| 2006/0193758 A1 | 8/2006 | Nam et al. | |
| 2007/0039815 A1 * | 2/2007 | Bartel | 204/242 |

FOREIGN PATENT DOCUMENTS

| | | |
|---|---|---|
| JP | 11256381 | 9/1999 |
| JP | 2006097061 | 4/2006 |
| JP | 2006097061 A * | 4/2006 |
| WO | 2004113591 | 12/2004 |

OTHER PUBLICATIONS

Nickel Development Institute, Corrosion Resistance of Nickel-Containing Alloys in Hydrofluoric Acid, Hydrogen Fluoride and Fluorine, Publication No. 443 (2014), http://www.nickelinstitute.org/~/Media/Files/TechnicalLiterature/CorrosionResistanceofNickel__ContainingAlloysinHydrofluoricAcid__HydrogenFlourideandFlourine__443__.pdf.*

PCT/NZ2008/000327, Written Opinion of the International Searching Authority, May 7, 2008.

* cited by examiner

HYDROGEN GENERATOR

FIELD OF THE INVENTION

The present invention is generally related to a hydrogen generator and particularly, although not exclusively, related to a hydrogen generator comprising a plurality of cells.

BACKGROUND TO THE INVENTION

Hydrogen gas has many industrial applications, such as combustion in engines in order to power vehicles. Hydrogen can be flammable and therefore it can be dangerous to store and transport on vehicles that are powered by it. However, producing hydrogen on board a vehicle can be inefficient.

It is an object of the present invention to provide an improved hydrogen generator or at least to provide the public with a useful choice.

SUMMARY OF THE INVENTION

In a first aspect the invention broadly consists in a hydrogen generator comprising:

an enclosure;

a series of spaced plates contained within the enclosure and defining between them liquidtight cells, with a plate forming a first wall of each cell of a nobler material than a plate forming a second wall of that cell, and where a first plate of the series is an anode arranged to be connected to a power supply and the last plate of the series is a cathode arranged to be connected to a power supply;

an inlet to each cell arranged to allow an electrolyte to flow into the cell; and an outlet from each cell arranged to allow an electrolyte and hydrogen gas to flow out of the cell.

Preferably, the enclosure comprises a series of lower support members arranged to hold or support lower edges of the plates.

Preferably the enclosure comprises a series of upper support members arranged to hold or support upper edges of the plates.

Preferably the hydrogen generator comprises a power supply connected to the anode and the cathode. More preferably, the power supply is a DC power supply.

Preferably, the hydrogen generator comprises a dump chamber provided below the cells. More preferably, the hydrogen generator comprises at least one dump port from each cell to the dump chamber. Even more preferably, the hydrogen generator comprises a dump gate associated with each dump port.

Preferably, the hydrogen generator comprises an associated fluid delivery system arranged to continuously or semi-continuously pass fluid electrolyte through the cells.

In a second aspect the invention broadly consists in a marine vessel comprising a hydrogen generator of the first aspect of the invention arranged to supply hydrogen as a fuel to an engine of the vessel.

The hydrogen generator of the marine vessel of the second aspect of the invention may have any of the preferred features as mentioned in relation to the first aspect of the invention.

Preferably, the marine vessel comprises an inlet in or associated with a hull of the vessel for salt water and pipework arranged to deliver salt water from the inlet to the hydrogen generator as electrolyte for the hydrogen generator.

In a third aspect the invention broadly consists in a power generator comprising a hydrogen generator of the first aspect of the invention arranged to supply hydrogen as a fuel to an electricity generating turbine.

The hydrogen generator of the power generator of the third aspect of the invention may have any of the preferred features as mentioned in relation to the first aspect of the invention.

In a fourth aspect the invention broadly consists in method of generating hydrogen comprising:

(a) feeding an electrolyte through an inlet in an enclosure into liquidtight cells formed from a series of spaced plates within the enclosure, where a first wall of each cell is of a nobler material than a second wall of that cell, and where a first plate of the series is arranged to be an anode and a last plate of the series is arranged to be a cathode;

(b) supplying power to the anode and the cathode to induce current flow in the electrolyte in each cell to generate hydrogen; and (c) collecting the hydrogen through an outlet from the enclosure.

Preferably, the method of generating hydrogen comprises supplying power from a DC power supply.

In a fifth aspect the invention broadly consists in a hydrogen generator comprising:

an enclosure; and a series of spaced plates contained within the enclosure and defining between them liquidtight cells, with a plate forming a first wall of each cell of a nobler material than a plate forming a second wall of that cell, and where a first plate of the series is an anode arranged to be connected to a power supply and the last plate of the series is a cathode arranged to be connected to a power supply.

Preferably, the hydrogen generator comprises an inlet to each cell arranged to allow an electrolyte to flow into the cell.

Preferably, the hydrogen generator comprises an outlet from each cell arranged to allow an electrolyte and hydrogen gas to flow out of the cell.

Preferably, the enclosure comprises a series of lower support members arranged to hold or support lower edges of the plates.

Preferably, the enclosure comprises a series of upper support members arranged to hold or support upper edges of the plates.

Preferably, the hydrogen generator comprises a power supply connected to the anode and the cathode. More preferably, the power supply is a DC power supply.

Preferably, the hydrogen generator comprises a dump chamber provided below the cells. More preferably, the hydrogen generator comprises at least one dump port from each cell to the dump chamber. Even more preferably, the hydrogen generator comprises a dump gate associated with each dump port.

Preferably, the hydrogen generator comprises an associated fluid delivery system arranged to continuously or semi-continuously pass fluid electrolyte through the cells.

In a sixth aspect the invention broadly consists in a marine vessel comprising a hydrogen generator of the fifth aspect of the invention arranged to supply hydrogen as a fuel to an engine of the vessel.

The hydrogen generator of the marine vessel of the sixth aspect of the invention may have any of the preferred features as mentioned in relation to the fifth aspect of the invention.

Preferably, the marine vessel comprises an inlet in or associated with a hull of the vessel for salt water and pipework arranged to deliver salt water from the inlet to the hydrogen generator as electrolyte for the hydrogen generator.

In a seventh aspect the invention broadly consists in a power generator comprising a hydrogen generator of the fifth aspect of the invention arranged to supply hydrogen as a fuel to an electricity generating turbine.

The hydrogen generator of the power generator of the seventh aspect of the invention may have any of the preferred features as mentioned in relation to the fifth aspect of the invention.

In an eighth aspect the invention broadly consists in a method of generating hydrogen comprising:

(a) providing an electrolyte into liquidtight cells in an enclosure, the cells formed from a series of spaced plates within the enclosure, where a first wall of each cell is of a nobler material than a second wall of that cell, and where a first plate of the series is arranged to be an anode and a last plate of the series is arranged to be a cathode;

(b) supplying power to the anode and the cathode to induce current flow in the electrolyte in each cell to generate hydrogen; and (c) collecting the hydrogen from the cells.

Preferably, the method of generating hydrogen comprises supplying power from a DC power supply.

The terms "more noble" and "less noble" as used in this specification and claims mean that as between two metals that one is more reactive with the electrolyte than the other, or that one resists corrosion more than the other when the two are exposed to an electrolyte, and "noble" "nobler" have a corresponding meaning.

The term "comprising" as used in this specification and claims means "consisting at least in part of". When interpreting each statement in this specification and claims that includes the term "comprising", features other than that or those prefaced by the term "comprising" may also be present. Related terms such as "comprise" and "comprises" are to be interpreted in the same manner.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

The invention generally relates to a hydrogen generator used to produce hydrogen gas. The hydrogen generator has an enclosure and an anode and a cathode. One or more plates are provided in the enclosure between the anode and cathode. An electrolyte is provided between the plates so that a galvanic or redox reaction occurs between the plates when a current is caused to flow between the anode and cathode, producing hydrogen gas.

Figure 1:
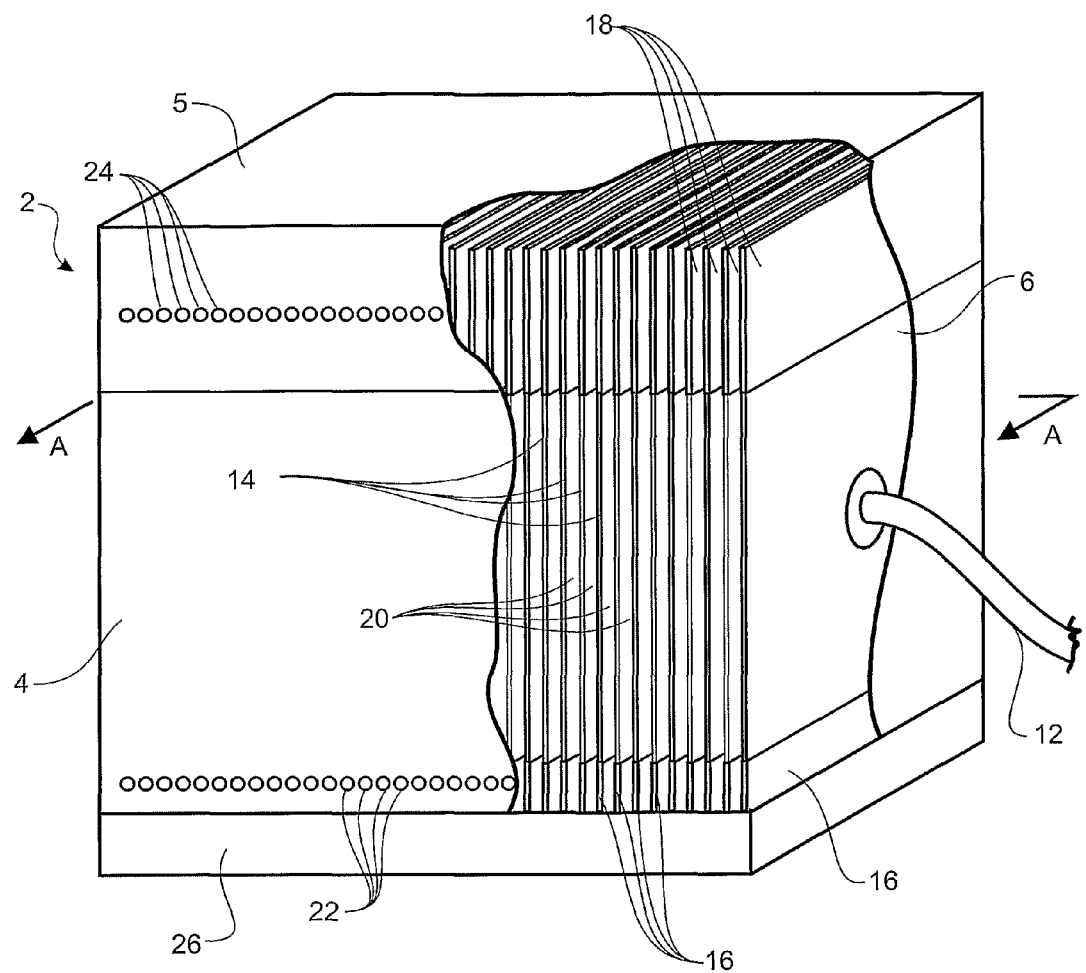
FIG. 1 is a partial cutaway perspective view of a hydrogen generator of the invention.
Figure 2:
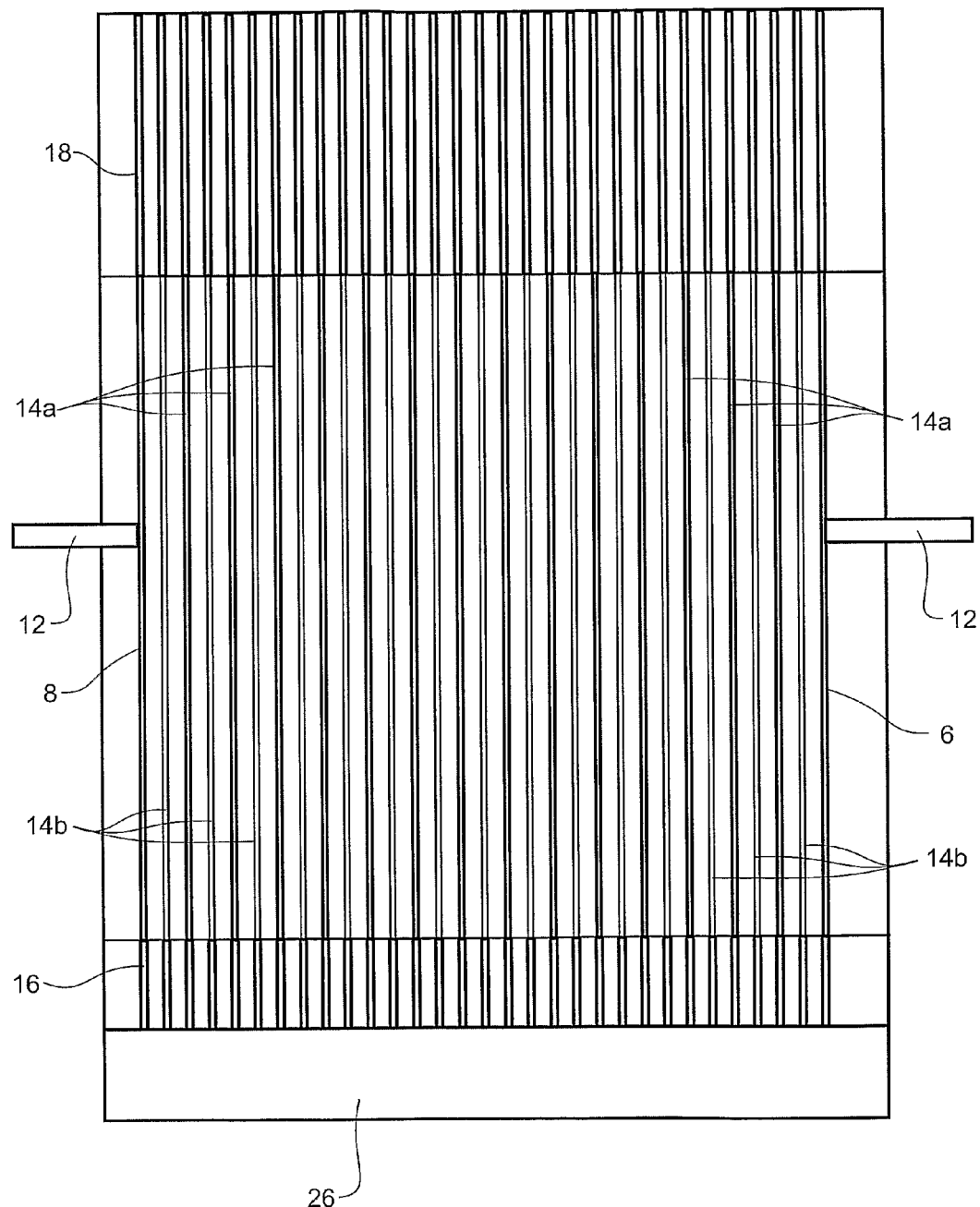
FIG. 2 is a cross-section view along the line AA' of the hydrogen generator of FIG. 1.
Figure 3:
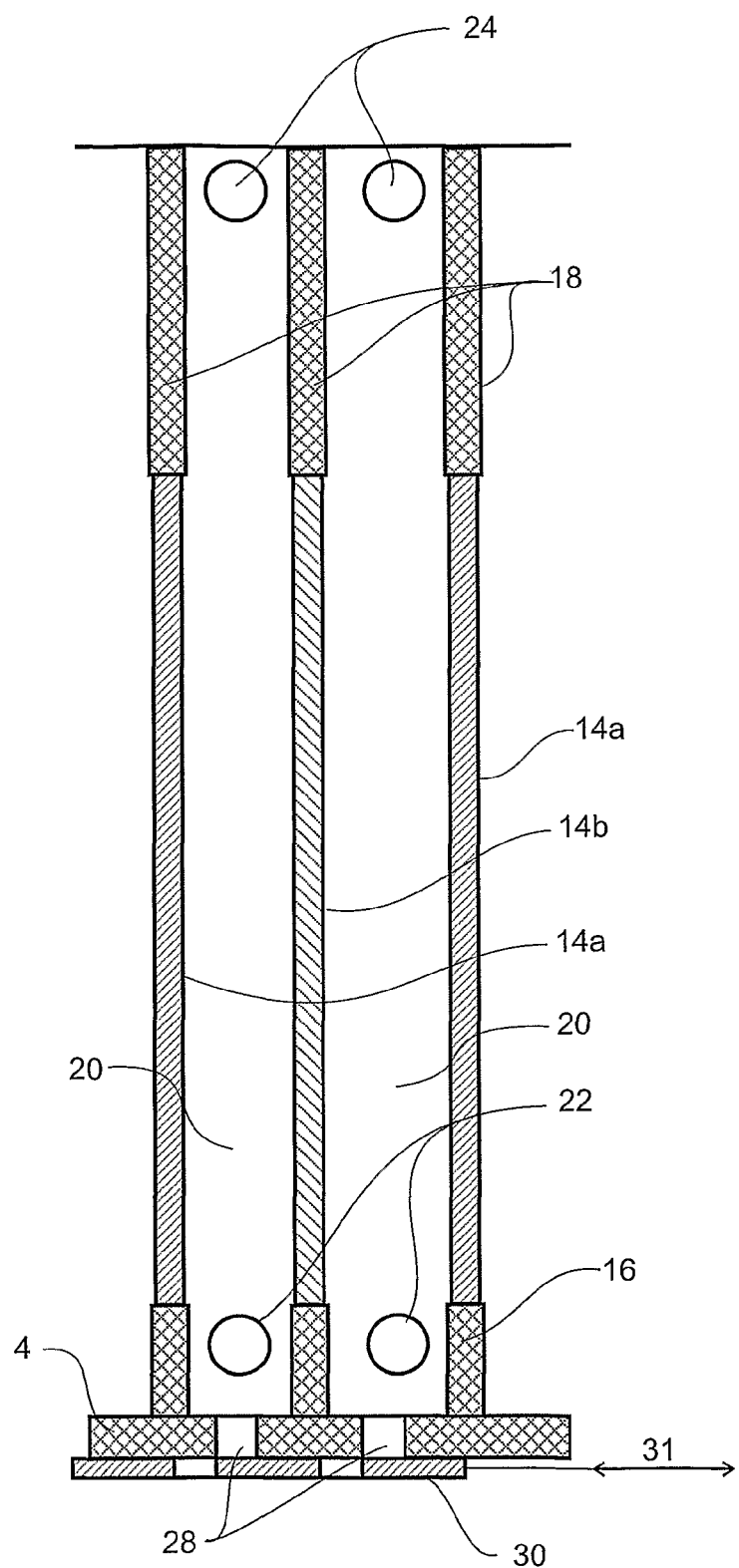
FIG. 3 is a close up elevation view of two cells of the hydrogen generator of FIG. 1.

Referring to FIGS. 1, 2, and 3, a hydrogen generator 2 comprises an enclosure 4. Preferably, the enclosure 4 is made from plastic such as polycarbonate, or a composite material such as micarta, or any other suitable material. The enclosure 4 may include a lid 5 that can be removed in order to access the inside of the hydrogen generator 2. The hydrogen generator also comprises an anode 6, and a cathode 8, which are collectively referred to as electrodes. The anode 6 and cathode 8 comprise metal plates. Preferably, the anode 6 and cathode 8 are made from the same material. Preferably, the anode 6 and cathode 8 are made from a relatively unreactive or noble metal such as for example stainless steel. However any suitable metal or material may be used. Preferably, the anode 6 and cathode 8, oppose each other at opposite ends of the enclosure 4. The anode 6 and cathode 8 are both arranged to be connected to a power supply through one or more electrical connections. Each electrical connection may be formed for example by connecting a wire 12 onto the electrode, and then connecting the wires to a power supply. Alternatively the wire 12 may for example be bolted onto the electrode, and may include a spring connection, a pressure connection, or any other suitable connection. More than one electrical connection may be made between each electrode and the power supply to provide redundancy in case of connection failure. Preferably, the power supply is a DC power supply, or a pulsed DC power supply, however any suitable power supply may be used. Generally, the anode 6 will be connected to the positive terminal of the power supply, and the cathode 8 will be connected to the negative terminal of the power supply.

The hydrogen generator 2 also comprises at least one plate 14 provided in the enclosure 2 between the anode 6 and cathode 8. Preferably, a plurality of plates 14 are provided in the enclosure 2 between the anode 6 and cathode 8. For example, twenty, forty, sixty, or eighty plates 14 may be provided, however any suitable number may be used. Generally, providing more metal plates 14 may result in production of more hydrogen gas. The plates 14 may be any suitable size such as 30 cm×30 cm and are preferably all the same size and also the same size as the anode 6 and cathode 8. Generally, a plate with a larger surface area may result in production of more hydrogen gas. The plates 14 are preferably made from a relatively noble material such as a noble metal, a noble semi-metal, a noble composite, or any other suitable material. Referring only to FIGS. 2 and 3, adjacent plates are made from a more noble or less noble than their neighbours. For example, every even plate 14a in the series of plates 14 is made from a more noble material than the odd plates 14b. Conversely, the odd plates 14b are less noble than the even plates 14a. Preferably, all of the even plates 14a are made from the one particular material and all of the odd plates 14b are made from a different particular material of lower nobility. For example, the even plates 14a may be made from stainless steel and the odd plates 14b may be made from aluminium. Alternatively, the even plates 14a may be less noble than the odd plates 14b. Preferably, the anode 6 and cathode 8 are the first and last plates 14 of the series of plates 14. Preferably, the anode 6 and cathode 8 are more noble than the plates 14 adjacent to them. Alternatively, the anode 6 and cathode 8 are less noble than the plates 14 adjacent to them. The series of plates 14 alternate between more noble plates and less noble plates.

Referring again to FIGS. 1, 2, and 3, preferably the plates 14 are provided in the enclosure 2 spaced apart and substantially parallel to the electrodes and substantially parallel to one another, however they may be provided in any suitable orientation. Preferably, the enclosure 2 has a series of lower support members 16 and a series of upper support members 18 used to support the electrodes 6, 8 and the plates 14. More preferably, the support members 16, 18 are made from the same material and are integral with the enclosure 2, however, the support members 16, 18 may be made from any suitable non-conductive material. The upper support members 18 may be attached to the lid 5 and may be removed from the hydrogen generator 2 when the lid 5 is removed. Joins between the support members 16, 18 and the enclosure 2 are liquidtight. Preferably, each of the electrodes 6, 8 and the plates 14 are supported on their lower edges by a lower support member 16 and on their upper edges by an upper support member 18. Any joins between the support members 16, 18 and the electrodes 6, 8 or plates 14 are liquidtight. Any joins between the enclosure 2 and electrodes 6, 8 or plates 14 are liquidtight. In a preferred embodiment, there may be a series of grooves provided on the inside walls of the enclosure 2 arranged to support the plates 14. A groove may run vertically between a lower support member 16 and its corresponding upper support member 18. The plates 14 may be slotted into these grooves and slid down until the lower edge contacts the lower support member 16. The lower support member 16 may have a groove along its length to help support the lower edge of the plate 14. When the plates 14 and electrodes have been placed in the enclosure 4, the lid 5 and upper support members 18 may be fitted. The upper support members 18 may have grooves running along their lengths to support the upper edges of the plates 14. These grooves may provide liquidtight joins between the plates 14, and the enclosure 4 and the support members 16, 18. In this embodiment, it may be possible to easily replace the plates 14 and electrodes for example if they reach the end of their consumable life due to galvanic consumption, corrosion, if they require cleaning, or for any other reason. The lid 5 and upper support members 18 may be removed to reveal the top edges of the old plates 14 and electrodes. The old plates 14 and electrodes may be removed by sliding them out of the grooves and then replaced by sliding new plates 14 and electrodes into the grooves. The lid 5 and upper support members 18 may then be replaced. Alternatively in other embodiments, permanent watertight joins may be made with an adhesive or bonding agent, or by fusing the two materials together, or in any other suitable manner.

This alternating nobility arrangement of electrodes and plates 14 creates a series of cells 20. Each cell 20 comprises a first element of a relatively more noble plate 14 and a second element of a relatively less noble plate 14. Adjacent cells 20 share a plate 14. Electrolyte is not able to flow through or around the plates 14 or support members 16, 18—each cell 20 is liquidtight from all other cells 20. This configuration of plates 14 to form cells 20 may cause a galvanic or redox reaction to occur when an electrolyte is provided in the cell 20.

Each cell 20 has an associated inlet 22 and outlet 24. The inlet and outlet may be apertures through the enclosure adjacent to each cell. Preferably, the inlet aperture 22 is provided near the bottom of the cell 20 on a face of the enclosure 4. More preferably, the inlet aperture is provided below the plates 14 and between the lower support members 16 if they are provided. Preferably, the outlet aperture 24 is provided near the top of the cell 20 on a face of the enclosure 4. More preferably, the outlet aperture is provided above the plates 14 and between the upper support members 18 if they are provided. For example, referring to FIG. 4, the outlet aperture 24 may be provided near the top of the enclosure 4 and near the centre of its length. Alternatively, the outlet aperture 24 may be provided near the top of the enclosure 4 and on the opposite face as the inlet aperture 22. Alternatively, the outlet aperture 24 may be provided near the top of the enclosure 4 and on the same face as the inlet aperture 22. The outlet aperture 24 may be provided on the lid 5. The apertures 22, 24 may be provided in any suitable position and be of any suitable size. The inlet aperture 22 may provide an inlet for an electrolyte to flow into a cell 20 and the outlet aperture 24 may provide an outlet for an electrolyte and hydrogen to flow out of a cell 20. Having the inlet aperture 22 below the outlet aperture 24 may help flush fresh electrolyte into the cell 20 and flush reacted electrolyte out of the cell 20.

Referring again to FIGS. 1, 2, and 3, prior to using the hydrogen generator 2, an electrolyte (not shown) is provided in each cell 20. Preferably, the electrolyte is salt water, however any suitable electrolyte may be used. Preferably, the faces of the plates 14 are entirely surrounded by the electrolyte to avoid oxidation or corrosion of the plates 14. Having the support members 16, 18 may help ensure that the faces of the plates 14 are consistently and entirely surrounded by the electrolyte when the hydrogen generator 2 is in use. The upper support members 18 may act as ballasts so that the electrolyte level will not drop below the top of the plates 14 if the hydrogen generator 2 is tipped or rolled.

Power may be supplied to the anode 6 and cathode 8, so that electron flow may be induced in the electrolyte in each cell 20. Generally, an electrolysis reaction takes place in the electrolyte, resulting in the production of hydrogen gas ($H_2$). By-products such as oxygen gas ($O_2$) and hydroxide ($OH-$) particles may also be produced. A concurrent galvanic reaction may take place in each cell 20 between the plates 14, where electrons flow from the less noble metal plate to the more noble metal plate. The galvanic reaction boosts the electrolysis reaction so that less energy is required to decompose the electrolyte and produce hydrogen gas.

When the hydrogen generator 2 is in use, the hydrogen gas may rise to the top of the cells 20. Other by-products, such as oxygen gas, may also rise to the top of the cells 20. Some by-products, such as hydroxide particles, may sink to the bottom of the cells 20. The lower support members 16 may contain between them the build-up of such by-product and prevent them from coming into contact with the plates 14. If by-product builds up sufficiently to settle directly against a plate 14 or bridge between plates it could fuse or adhere to the plate 14 and adversely affect the performance of the hydrogen generator 2. By-product may be collected in a dump system 26 which may be provided below the cells 20. Referring only to FIG. 3, a dump system 26 may comprise a dump port 28 below each cell 20 which may be cylindrical, cubic, tapered, or any other suitable shape and may run along the entire length of the cell 20. Alternatively, the dump ports 28 may be provided discretely along the length of the cell 20. The dump ports 28 may be constructed as apertures in the base of the enclosure 4. Each dump port 28 may have an associated dump gate 30 which may normally be closed but may open to dump collected by-product from the hydrogen generator 2. The dump gates 30 may have an associated actuator 31 to open or close the dump gates 30. The actuator 31 may be pneumatic, hydraulic, an electric device, or any other suitable type of actuator. Alternatively, there may be no dump ports and the by-products may collect directly on the dump gates 30. The actuator 31 may cause the dump gates 30 to open in order to flush by-product from the cells 20 into a drain or dump chamber below.

Figure 4:
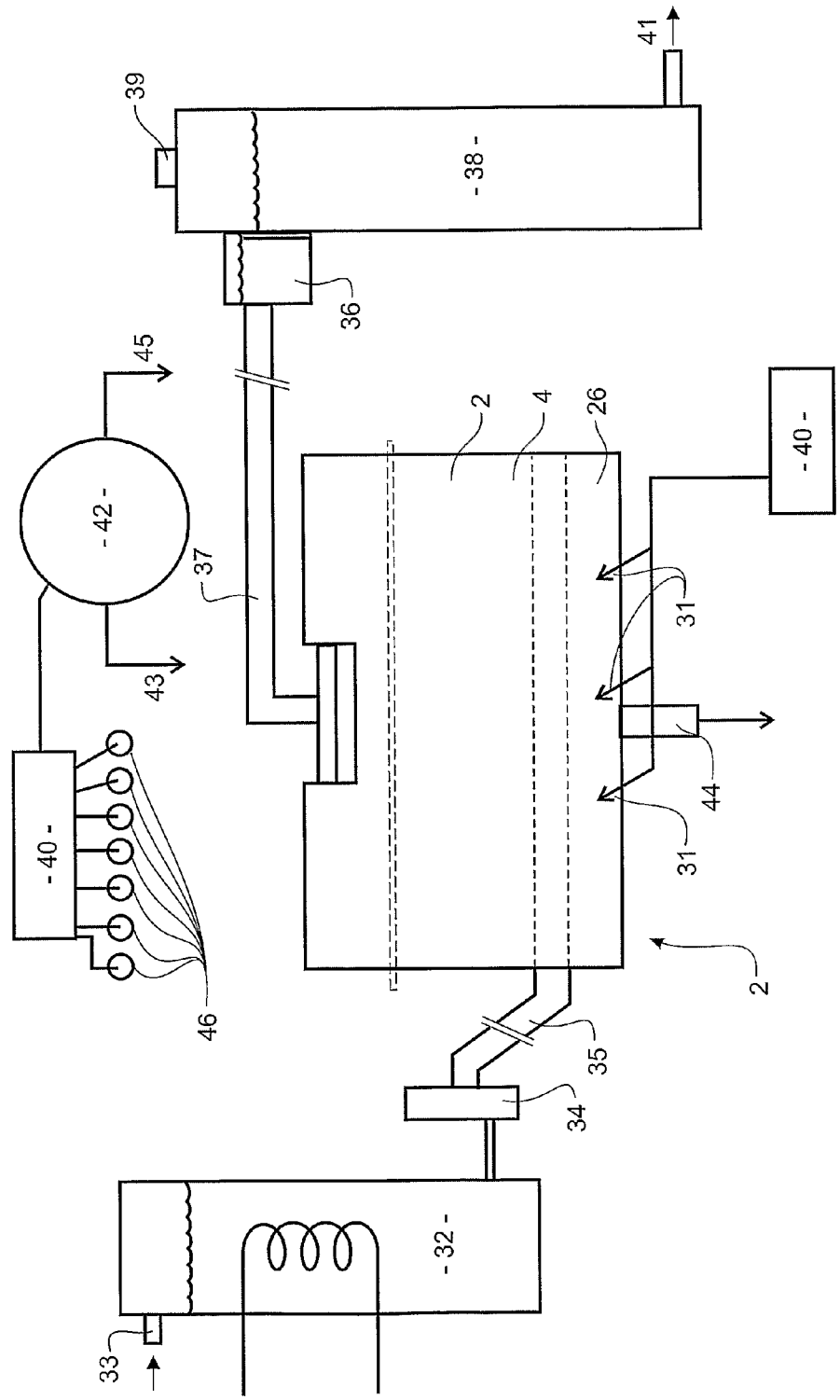
FIG. 4 is a schematic view of a hydrogen generation system.

Referring to FIG. 4, a system for generating hydrogen includes the hydrogen generator 2. The electrolyte may be introduced into a heat exchanger 32, such as a shell and tube heat exchanger, through an inlet 33. Preferably, the heat exchanger 32 is suitably sized and shaped to remove any air or other gases from the electrolyte before it enters the hydrogen generator 2. Introducing these gases is undesirable as it may oxidise the plates 14. The electrolyte is preferably salt water. The electrolyte is preferably heated to 30° C.-50° C. or hotter. Heating the electrolyte may help improve production rates of hydrogen gas as generally a hotter electrolyte decomposes faster than a colder electrolyte.

The electrolyte may be transferred to an inlet manifold 34 for example with a pump and valve system. The inlet manifold 34 preferably has one input pipe and a number of output pipes 35 equal to the number of cells 20 in the hydrogen generator 2. Each output pipe 35 may be connected to an inlet aperture 22 of the hydrogen generator 2 in order to supply the electrolyte to the cells 20. The electrolyte may be continuously fed into each cell 20 so that there is a constant flow of fresh electrolyte which has not undergone a redox reaction.

As the electrolyte circulates through the cell 20 it may undergo a redox reaction in which hydrogen gas and other by-products are produced. The hydrogen and reacted electrolyte may be fed out of the cell 20 through the outlet aperture 24. Each cell 20 and outlet aperture 24 may have an associated pipe 37 which may transfer the electrolyte and hydrogen to an outlet manifold 36. The outlet manifold 36 may have an associated arrestor to prevent the hydrogen from igniting, however arrestors may be provided in the system at any suitable point. Preferably, the inlet manifold output pipes 37 and the outlet manifold input pipes 37 are long enough to provide a suitable electrolytic resistance between the cells 20. This may be so that electron transfer between cells 20 is directly through the plates 14, and not through the electrolyte circuit via the manifolds 34, 36.

The hydrogen and electrolyte may pass through the outlet pipe of the outlet manifold 36 into a separator 38. The hydrogen may be separated from the electrolyte and then stored or transferred for combustion. The electrolyte may be re-circulated back into the system, for example into the heat exchanger 32, but is preferably discharged. The hydrogen may be discharged through a valve 39 and the electrolyte may be discharged through an outlet 41. If a by-product of the redox reaction, such as oxygen, has contaminated the hydrogen, this may be separated at any point in any suitable way, for example by using a membrane or using sorption or cryogenic distillation methods.

Preferably, the system has one or more processors 40. The processors 40 may control the power supply 42 which supplies power to the anode 6 and cathode 8. Preferably, the power supply 42 is a DC power supply. The power supply 42 may have a positive terminal which may be connected to the anode 6, and a negative terminal 45 which may be connected to the cathode 8. The processors 40 may also be connected to one or more sensors 46. The sensors 46 and processor 40 may for example monitor the temperature at suitable points of the system such as at the outlet of the heat exchanger 32, the voltage and current being drawn by the hydrogen generator, the volume of hydrogen produced, or any other suitable characteristic of the system. The processor 40 may log data for later analysis or may be arranged to shut down the system if adverse conditions are detected. The processors 40 may control the dump gate actuators 31 to open and close. The dump gates 28 may open and close periodically or on demand. When the dump gates 28 open unwanted by-products flush out of the bottom of the cells 20 through a drain 44. This may cause the electrolyte to also flush while the dump gates 28 are open. The processors 40 may cause the pumps to boost the flow rate of the electrolyte through the system while the dump gates 28 are open in order to minimise the time that the electrolyte isn't entirely covering the faces of the plates 14. Alternatively, one or more boost pumps may be provided to increase the electrolyte flow rate.

The hydrogen generator 2 or the system including the hydrogen generator 2 may be used to power a vehicle, particularly a marine vessel such as a boat. In a marine vessel application, the electrolyte may be seawater that may be sourced from the sea that the vessel floats on, though an inlet on the submerged part of the hull of the boat for example. The seawater may be fed into the heat exchanger 32 which may heat the seawater by using heat sourced from the engine cooling system. The hydrogen generated may then be used to power the engine of the marine vessel such as an inboard motor or an outboard motor. The engine may run an alternator that may supply power to the anode 6 and cathode 8 directly or through a power converter.

The foregoing description of the invention includes preferred forms thereof. Modifications may be made thereto without departing from the scope of the invention as defined in the accompanying claims.

The invention claimed is:

1. A hydrogen generator comprising:
an enclosure to contain an aqueous electrolyte;
an anode and a cathode in the enclosure and electrical connections to the anode and cathode for passing an electrical current through the electrolyte in the enclosure to cause an electrolysis reaction to take place to decompose the electrolyte and produce hydrogen gas;
a series of spaced plates contained within an enclosure and defining between them cells, between the anode and the cathode, a plate forming a first wall of each cell consisting of a relatively more noble material selected from the group consisting of a noble metal, a noble semi-metal, or a noble composite and a plate forming a second wall of that cell consisting of a relatively less noble material selected from the group consisting of a noble metal, a noble semi-metal, or a noble composite such that a concurrent galvanic reaction will take place between the plates simultaneously with said electrolysis reaction to further produce hydrogen gas, the cells being liquidtight from each other, said cells comprising electrolyte flow ports for electrolyte flow through said cells, said electrolyte flow ports being of sufficient length that electron flow between cells will occur predominantly through said spaced plates defining between them said cells; and
a gas outlet for feeding out hydrogen gas from the enclosure;
wherein the first wall faces the second wall across a first gap and the second wall faces a different first wall of an adjacent cell across a second gap.

2. A hydrogen generator according to claim 1 where the enclosure comprises a series of lower support members arranged to hold or support lower edges of the plates.

3. A hydrogen generator according to claim 1 where the enclosure comprises a series of upper support members arranged to hold or support upper edges of the plates.

4. A hydrogen generator according to claim 1 comprising a power supply connected to the anode and the cathode.

5. A hydrogen generator according to claim 1 comprising a dump chamber provided below the cells.

6. A hydrogen generator according to claim 5 comprising at least one dump port from each cell to the dump chamber.

7. A hydrogen generator according to claim 6 comprising a dump gate associated with each dump port.

8. A hydrogen generator according to claim 1 comprising an associated fluid delivery system arranged to continuously or semi-continuously pass fluid electrolyte through the cells.

9. A marine vessel comprising a hydrogen generator according to claim 1 arranged to supply hydrogen as a fuel to an engine of the vessel.

10. A marine vessel according to claim 9 comprising an inlet in or associated with a hull of the vessel for salt water and pipework arranged to deliver salt water from the inlet to the hydrogen generator as electrolyte for the hydrogen generator.

11. A power generator comprising a hydrogen generator according to claim 1 arranged to supply hydrogen as a fuel to an electricity generating turbine.

12. A method of generating hydrogen comprising:
(a) providing an aqueous electrolyte into an enclosure, comprising an anode and a cathode in the enclosure, with electrical connections to the anode and cathode for passing an electrical current through the electrolyte to cause an electrolysis reaction to take place to decompose the electrolyte and produce hydrogen gas, the enclosure also comprising, a series of spaced plates within the enclosure defining between them cells between the anode and the cathode, a plate forming a first wall of each cell consisting of a relatively more noble material selected from the group consisting of a noble metal, a noble semi-metal, or a noble composite and a plate forming a second wall of that cell consisting of a relatively less noble material selected from the group consisting of a noble metal, a noble semi-metal, or a noble composite such that a concurrent galvanic reaction takes place between the plates simultaneously with said electrolysis reaction to further produce hydrogen gas, the cells being liquidtight from each other and comprising electrolyte flow ports for electrolyte flow through said cells, said electrolyte flow ports being of sufficient length that electron flow between cells will occur predominantly through said spaced plates defining between them said cells;
(b) supplying power to the anode and the cathode to induce current flow in the electrolyte to cause an electrolysis reaction to take place to generate hydrogen; and
(c) collecting the hydrogen from the cells;
wherein the first wall faces the second wall across a first gap and the second wall faces a different first wall of an adjacent cell across a second gap.

13. A hydrogen generator according to claim 1 comprising a common outlet from each cell arranged to allow electrolyte and hydrogen gas to flow out of the cell.

14. A hydrogen generator according to claim 1 where the enclosure comprises a series of lower support members arranged to hold or support lower edges of the plates.

* * * * *